(12) United States Patent
Babayoff et al.

(10) Patent No.: US 9,651,419 B2
(45) Date of Patent: *May 16, 2017

(54) SPECKLE REDUCTION METHOD AND APPARATUS

(71) Applicant: ALIGN TECHNOLOGY, INC., San Jose, CA (US)

(72) Inventors: Noam Babayoff, Rishon LeZion (IL); Yossef Atiya, Maccabim (IL); Tzvi Philipp, Bet Shemesh (IL)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,038

(22) Filed: May 29, 2013

(65) Prior Publication Data

US 2013/0256517 A1   Oct. 3, 2013

Related U.S. Application Data

(63) Continuation of application No. 12/908,567, filed on Oct. 20, 2010, now Pat. No. 8,476,581, which is a
(Continued)

(51) Int. Cl.
*G02B 27/48* (2006.01)
*G01J 1/04* (2006.01)
(Continued)

(52) U.S. Cl.
CPC .......... *G01J 1/0448* (2013.01); *G02B 21/006* (2013.01); *G02B 21/008* (2013.01);
(Continued)

(58) Field of Classification Search
CPC . H04N 1/113; H04N 1/193; G01J 1/04; G01J 1/0448; G01J 1/00; G02B 21/0056; G02B 27/48; G03H 1/32
(Continued)

(56) References Cited

U.S. PATENT DOCUMENTS 2,467,432 A   4/1949   Kesling
3,407,500 A   10/1968  Kesling
(Continued)

FOREIGN PATENT DOCUMENTS

AU   3031677 A    5/1979
AU    517102 B2   7/1981
(Continued)

OTHER PUBLICATIONS

Trisnadi. Speckle contrast reduction in laser projection displays. Silicon Light Machine, Sunnyvale, California 94089. 2000.
(Continued)

*Primary Examiner* — David Porta
*Assistant Examiner* — Don Williams
(74) *Attorney, Agent, or Firm* — Wilson Sonsini Goodrich & Rosati (57) ABSTRACT

An apparatus adapted for confocal imaging of a non-flat specimen comprising a coherent light source for producing a light beam, imaging optics adapted to focus the light beam into at least one spot on a surface of a specimen, and a detector adapted to receive and detect light reflected from the specimen surface. The imaging optics comprise at least one optical component located so that the light reflected from the specimen surface passes therethrough on its way to the detector. The optical component is movable so as to move the at least one spot, within a range of movement, to a number of distinct locations in a plane perpendicular to the apparatus' optical axis, within the detector's integration time.

21 Claims, 2 Drawing Sheets

Related U.S. Application Data continuation of application No. 11/715,952, filed on Mar. 9, 2007, now Pat. No. 7,838,816, which is a continuation of application No. 11/320,632, filed on Dec. 30, 2005, now Pat. No. 7,214,946, which is a continuation of application No. 10/633,304, filed on Aug. 4, 2003, now Pat. No. 7,030,383.

(51) Int. Cl.
  *G02B 21/00* (2006.01)
  *G03H 1/32* (2006.01)

(52) U.S. Cl.
  CPC ......... *G02B 21/0056* (2013.01); *G02B 27/48* (2013.01); *G03H 1/32* (2013.01)

(58) Field of Classification Search
  USPC .......... 250/200–201.9, 234–235, 216, 208.1, 250/201.8, 231.9; 359/354–355, 359/368–378, 384, 388; 356/398–400, 356/622, 630
  See application file for complete search history.

(56) References Cited

U.S. PATENT DOCUMENTS

| | | |
|---|---|---|
| 3,600,808 A | 8/1971 | Reeve |
| 3,660,900 A | 5/1972 | Andrews |
| 3,683,502 A | 8/1972 | Wallshein |
| 3,738,005 A | 6/1973 | Cohen |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,155,630 A | 5/1979 | Ih |
| 4,195,046 A | 3/1980 | Kesling |
| 4,253,828 A | 3/1981 | Coles et al. |
| 4,256,363 A | 3/1981 | Briones |
| 4,324,546 A | 4/1982 | Heitlinger et al. |
| 4,324,547 A | 4/1982 | Arcan et al. |
| 4,348,178 A | 9/1982 | Kurz |
| 4,363,961 A | 12/1982 | Okada et al. |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,511,220 A | 4/1985 | Scully |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,024,529 A * | 6/1991 | Svetkoff et al. ............... 356/608 |
| 5,027,281 A | 6/1991 | Rekow et al. |
| 5,035,613 A | 7/1991 | Breads et al. |
| 5,045,679 A * | 9/1991 | Suzuki et al. ............. 250/201.1 |
| 5,046,795 A | 9/1991 | Morimoto et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,813,987 A | 9/1998 | Modell et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |

(56) References Cited

U.S. PATENT DOCUMENTS

| | | | |
|---|---|---|---|
| 5,971,754 | A | 10/1999 | Sondhi et al. |
| 5,975,893 | A | 11/1999 | Chishti et al. |
| 6,015,289 | A | 1/2000 | Andreiko et al. |
| 6,044,309 | A | 3/2000 | Honda |
| 6,049,743 | A | 4/2000 | Baba |
| 6,062,861 | A | 5/2000 | Andersson |
| 6,068,482 | A | 5/2000 | Snow |
| 6,081,381 | A | 6/2000 | Shalapenok et al. |
| 6,099,314 | A | 8/2000 | Kopelman et al. |
| 6,123,544 | A | 9/2000 | Cleary |
| 6,134,009 | A * | 10/2000 | Zavislan .............. 356/364 |
| 6,152,731 | A | 11/2000 | Jordan et al. |
| 6,183,248 | B1 | 2/2001 | Chishti et al. |
| 6,190,165 | B1 | 2/2001 | Andreiko et al. |
| 6,217,325 | B1 | 4/2001 | Chishti et al. |
| 6,217,334 | B1 | 4/2001 | Hultgren |
| 6,244,861 | B1 | 6/2001 | Andreiko et al. |
| 6,288,382 | B1 | 9/2001 | Ishihara |
| 6,309,215 | B1 | 10/2001 | Phan et al. |
| 6,315,553 | B1 | 11/2001 | Sachdeva et al. |
| 6,322,359 | B1 | 11/2001 | Jordan et al. |
| 6,350,120 | B1 | 2/2002 | Sachdeva et al. |
| 6,382,975 | B1 | 5/2002 | Poirier |
| 6,398,548 | B1 | 6/2002 | Muhammad et al. |
| 6,402,707 | B1 | 6/2002 | Ernst |
| 6,449,042 | B1 | 9/2002 | Hamann |
| 6,482,298 | B1 | 11/2002 | Bhatnagar |
| 6,524,101 | B1 | 2/2003 | Phan et al. |
| 6,545,264 | B1 | 4/2003 | Stern |
| 6,554,611 | B2 | 4/2003 | Chishti et al. |
| 6,572,372 | B1 | 6/2003 | Phan et al. |
| 6,577,394 | B1 | 6/2003 | Zavislan |
| 6,629,840 | B2 | 10/2003 | Chishti et al. |
| 6,657,216 | B1 | 12/2003 | Poris |
| 6,705,863 | B2 | 3/2004 | Phan et al. |
| 6,722,880 | B2 | 4/2004 | Chishti et al. |
| 6,750,974 | B2 | 6/2004 | Svetkoff et al. |
| 7,030,383 | B2 | 4/2006 | Babayoff et al. |
| 7,838,816 | B2 * | 11/2010 | Babayoff et al. .............. 250/234 |
| 8,476,581 | B2 | 7/2013 | Babayoff et al. |
| 2001/0055462 | A1 | 12/2001 | Seibel |
| 2002/0006597 | A1 | 1/2002 | Andreiko et al. |
| 2002/0122246 | A1 | 9/2002 | Tearney et al. |
| 2002/0192833 | A1 * | 12/2002 | Pan et al. .............. 436/164 |
| 2003/0001072 | A1 * | 1/2003 | Dorsel et al. .............. 250/201.5 |
| 2003/0009252 | A1 | 1/2003 | Pavlovskaia et al. |
| 2003/0139834 | A1 | 7/2003 | Nikolskiy et al. |
| 2003/0184726 | A1 * | 10/2003 | Laurent .............. G01S 7/487 356/3.07 |
| 2003/0202095 | A1 * | 10/2003 | Schultz .............. 348/142 |
| 2003/0224311 | A1 | 12/2003 | Cronauer |
| 2004/0021871 | A1 | 2/2004 | Psaltis et al. |
| 2004/0128010 | A1 | 7/2004 | Pavlovskaia et al. |
| 2005/0036667 | A1 | 2/2005 | So et al. |
| 2005/0055118 | A1 | 3/2005 | Nikolskiy et al. |

FOREIGN PATENT DOCUMENTS

| | | |
|---|---|---|
| AU | 5598894 A | 6/1994 |
| CA | 1121955 | 4/1982 |
| DE | 2749802 | 5/1978 |
| DE | 69327661 T | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 8/1995 |
| EP | 0731673 B1 | 9/1996 |
| EP | 0774933 B1 | 5/1997 |
| ES | 463897 | 1/1980 |
| FR | 2369828 | 6/1978 |
| FR | 2652256 | 3/1991 |
| GB | 15500777 | 8/1979 |
| JP | 53-058191 | 5/1978 |
| JP | 04-028359 | 1/1992 |
| JP | 08-508174 | 9/1996 |
| JP | 10-0239036 A | 9/1998 |
| WO | WO 90/08512 A1 | 8/1990 |
| WO | WO 91/04713 A1 | 4/1991 |
| WO | WO 94/10935 A1 | 5/1994 |
| WO | WO 98/32394 A1 | 7/1998 |
| WO | WO 98/44865 A1 | 10/1998 |
| WO | WO 98/58596 A1 | 12/1998 |
| WO | WO 00/08415 A1 | 2/2000 |

OTHER PUBLICATIONS

Wang, et al. Speckle reduction in laser projection systems by diffractive optical elements. Appl Opt. Apr. 1, 1998;37(10):1770-5.

AADR. American Association for Dental Research, Summary of Activities, Mar. 20-23, 1980, Los Angeles, CA, p. 195.

Alcaniz, et al. "An Advanced System for the Simulation and Planning of Orthodontic Treatments," Karl HF Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler et al., "Analysis of 3-D Data for Comparative 3-D Serial Growth Pattern Studies of Oral-Facial Structures," AADR Abstracts, Program and Abstracts of Papers, 57th General Session, IADR HP Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Altschuler, "3D Mapping of Maxillo-Facial Prosthesis," AADR Abstract #607, 2 pages total, (1980).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind, "Integrated Three-Dimensional Craniofacial Mapping: Background, Principles, and Perspectives," Semin. in Orthod., 7(4):223-232 (Dec. 2001).

Begole et al., "A Computer System for the Analysis of Dental Casts," The Angle Orthod., 51(3):253-259 (Jul. 1981).

Bernard et al.,"Computerized Diagnosis in Orthodontics for Epidemiological Studies: A ProgressReport," Abstract, J. Dental Res. Special Issue, vol. 67, p. 169, paper presented at International Association for Dental Research 66th General Session, Mar. 9-13, 1988, Montreal, Canada.

Bhatia et al., "A Computer-Aided Design for Orthognathic Surgery," Br. J. Oral Maxillofac. Surg., 22:237-253 (1984).

Biggerstaff et al., "Computerized Analysis of Occlusion in the Postcanine Dentition," Am. J. Orthod., 61(3): 245-254 (Mar. 1972).

(56) References Cited

OTHER PUBLICATIONS

Biggerstaff, "Computerized Diagnostic Setups and Simulations," Angle Orthod., 40(1):28-36 (Jan. 1970).
Biostar Opeation & Training Manual. Great Lakes Orthodontics, Ltd. 199 Fire Tower Drive,Tonawanda, New York. 14150-5890, 20 pages total (1990).
Blu, et al., "Linear interpolation revitalized", IEEE Trans. Image Proc., 13(5):710-719 (May 2004).
Bourke, "Coordinate System Transformation," (Jun. 1996), p. 1, retrieved from the Internet Nov. 5, 2004, URL <http://astronomy.swin.edu.au/—pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone (interview), "Dr. Charles J. Burstone on the Uses of the Computer in Orthodontic Practice (Part 1)," J. Clin. Orthod., 13(7):442-453 (Jul. 1979).
Burstone (interview), "Dr. Charles J. Burstone on the Uses of the Computer in Orthodontic Practice (Part 2)," J. Clin. Orthod., 13(8):539-551 (Aug. 1979).
Burstone et al., Precision Adjustment of the Transpalatal Lingual Arch: Computer Arch Form Predetermination, Am, Journal of Orthodontics, vol. 79, No. 2 (Feb. 1981), pp. 115-133.
Cardinal Industrial Finishes, Powder Coatings information posted at <http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, a Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1: CAD/CAM: The Computer Moves Chairside," "Part 2: F. Duret—A Man With a Vision," "Part 3: The Computer Gives New Vision—Literally," "Part 4: Bytes 'N Bites" The Computer Moves From the Front Desk to the Operatory, Canadian Dental Journal, vol. 54(9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin Orthod., 7(4):258-265 (Dec. 2001).
Cutting et al., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production, pp. 1-7 (Jan. 1992).
Definition for gingiva. Dictionary.com p. 1-3. Retrieved from the internet Nov. 5, 2004 <http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium on Computer Restorations: State of the Art of the CEREC-Method, May 1991, 2 pages total.
Dentrac Corporation, Dentrac document, pp. 4-13 (1992).
Dent-X posted on Sep. 24, 1998 at <http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances-Pro Lab, 1 page (1997).
Duret et al, "CAD-CAM in Dentistry," J. Am. Dent. Assoc. 117:715-720 (Nov. 1988).
Duret et al., "CAD/CAM Imaging in Dentistry," Curr. Opin. Dent., 1:150-154 (1991).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Faber et al., "Computerized Interactive Orthodontic Treatment Planning," Am. J. Orthod., 73(1):36-46 (Jan. 1978).
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internet: <http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management,"J. Clin. Orthod., 16(6):390-407 (Jun. 1982).
Grayson, "New Methods for Three Dimensional Analysis of Craniofacial Deformity, Symposium: Computerized Facial Imaging in Oral and Maxiiofacial Surgery," AAOMS, 3 pages total, (Sep. 13, 1990).
Guess et al., "Computer Treatment Estimates in Orthodontics and Orthognathic Surgery," JCO, pp. 262-28 (Apr. 1989).
Heaven et al., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), lnformatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).

(56) References Cited

OTHER PUBLICATIONS

Important Tip About Wearing the Red White & Blue Active Clear Retainer System, Allesee Orthodontic Appliances-Pro Lab, 1 page 1998).
JCO Interviews, Craig Andreiko , DDS, MS on the Elan and Orthos Systems, JCO, pp. 459-468 (Aug. 1994).
JCO Interviews, Dr. Homer W Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
Kamada et.al., Case Reports on Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling et al., The Philosophy of the Tooth Positioning Appliance, American Journal of Orthodontics and Oral surgery. 1945; 31:297-304.
Kesling, Coordinating the Predetermined Pattern and Tooth Positioner with Conventional Treatment, Am. J. Orthod. Oral Surg. (1946) 32:285-293.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 Dental Imprints: An Application in Orthodontics," IEEE Transactions on Medical Imaging, 10(3):453-461 (Sep. 1991).
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus:Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
PROCERA Research Projects, "PROCERA Research Projects 1993—Abstract Collection," pp. 3-7, 28 (1993).
Proffit et al., Contemporary Orthodontics, (Second Ed.), Chapter 15, Mosby Inc., pp. 470-533 (Oct. 1993).
Raintree Essix & ARS Materials, Inc , Raintree Essix, Technical Magazine Table of contents and Essix Appliances, <http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording the Dental Cast in Three Dimensions," Am. J. Orthod. Dentofacial Orthop., 92(3):199-206 (Sep. 1987).
Rudge, "Dental Arch Analysis: Arch Form, a Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning,"Arch. Otolamp! Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively).
Shilliday, (1971). Minimizing finishing problems with the minipositioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).

(56) References Cited

OTHER PUBLICATIONS

Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee Orthodontic Appliances-Pro Lab product information for doctors. http://ormco.com/aoa/appliances-services/RWB/doctorhtml>, 5 pages (May 19, 2003).
The Choice is Clear: Red, White & Blue . . . The Simple, Affordable, No-Braces Treatment, Allesee Orthodontic Appliances-Pro Lab product information for patients, <http://ormco.com/aoa/appliancesservices/RWB/patients html>, 2 pages (May 19, 2003).
The Choice Is Clear: Red, White & Blue . . . The Simple, Affordable, No-Braces Treatment, Allesee Orthodontic Appliances-Pro Lab product information, 6 pages (2003).
The Red, White & Blue Way to Improve Your Smile! Allesee Orthodontic Appliances-Pro Lab product information for patients, 2 pages 1992.
Truax L., "Truax Clasp-Less(TM) Appliance System," Funct. Orthod., 9(5):22-4, 268 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed on Jun. 20, 1997, 41 pages total.
Van Der Linden et al., "Three-Dimensional Analysis of Dental Casts by Means of the Optocom," J. Dent. Res., p. 1100 (Jul.-Aug. 1972).
Van Der Linden, "A New Method to Determine Tooth Positions and Dental Arch Dimensions," J. Dent. Res., 51(4):1104 (Jul.-Aug. 1972).
Van Der Zel, "Ceramic-Fused-to-Metal Restorations with a New CAD/CAM System," Quintessence Int., 24(11):769-778 (1993).
Varady et al., "Reverse Engineering of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.

Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); I11.—The General Concept of the D.P. Method and Its Therapeutic Effect, Part 2. Skeletal Reversed Occlusion Case Reports," Nippon Dental Review, 458:112-129 (Dec. 1980).
Yoshii, "Research on a New Orthodontic Appliance: The Dynamic Positioner (D.P.); I11. The General Concept of the D.P. Method and Its Therapeutic Effect, Part 1, Dental and Functional Reversed Occlusion Case Reports," Nippon Dental Review, 457:146-164 (Nov. 1980).
You May Be a Candidate for This Invisible No-Braces Treatment, Allesee Orthodontic Appliances-Pro Lab product information for patients, 2 pages (2002).

\* cited by examiner

SPECKLE REDUCTION METHOD AND APPARATUS

CROSS REFERENCE

This application is a continuation of U.S. patent application Ser. No. 12/908,567, filed on Oct. 20, 2010, now U.S. Pat. No. 8,476,581, which is a continuation of U.S. patent application Ser. No. 11/715,952, filed on Mar. 9, 2007, now U.S. Pat. No. 7,838,816, which is a continuation of application Ser. No. 11/320,632, filed on Dec. 30, 2005, now U.S. Pat. No. 7,214,946, which is a continuation of application Ser. No. 10/633,304, filed on Aug. 4, 2003, now U.S. Pat. No. 7,030,383, the content of each of which is hereby incorporated by reference in its entirety.

FIELD OF THE INVENTION

This invention relates to the reduction of speckle noise in optical systems comprising imaging optics, in which a coherent light source is used.

BACKGROUND OF THE INVENTION

A common difficulty associated with the use of coherent light sources such as lasers in imaging optical systems is a phenomenon known as speckle. Speckle arises when coherent light scattered from a rough surface is detected by an intensity detector that has a finite aperture, such as an observer's eye or a detector. The image on the screen appears to be quantized into little areas with sizes equal to the detector resolution spot. The detected spot intensity varies randomly from darkest, if contributions of the scattering points inside the spot interfere destructively, to brightest if they interfere constructively. This spot-to-spot intensity fluctuation is referred to as speckle. The resultant speckled light signal on the detector appears as spatial and temporal noise in whatever sensor is used in the imaging system.

Speckle reduction is known to involve averaging a number of independent speckle configurations, i.e. obtained from different un-correlated and non-interfering reflecting beams. Since speckle depends on essentially three light parameters: angle, polarization, and wavelength of the illuminating laser beam, independent speckle configurations can be generated through the diversification of any of these three light parameters. To solve the problem of speckle, many attempts have been made, mostly based on angle diversification, obtained by means of diffusers and/or movable optical elements, or by means of polarization diversification.

In U.S. Pat. No. 4,155,630 to Ih, there is disclosed a process and apparatus for improving image creation in a coherent light imaging system which involves directing a diffused light onto a mirror having a rocking motion whereby angle diversification is obtained. The rocking motion causes the reflected rays to sweep a two-dimensional area and focus the reflected light through a diffuser before collimating the rays for use in image creation. Applying a combination of voltages to three independent piezo-electric crystals upon which the mirror is mounted produces the rocking motion of the mirror.

U.S. Pat. No. 6,081,381 to Shalapenok, et al., describes a method and apparatus for eliminating speckle in an optical system by angle diversification obtained by the use of a diffuser and by a rotating micro-lens array having a rotational speed related to the laser parameters. The micro-lens illumination comes off of a stationary diffuser and eventually provides a large area that is uniform and speckle free illumination.

U.S. Pat. No. 4,511,220 to Scully, discloses a laser target speckle eliminator for laser light reflected from a distant target whose roughness exceeds the wavelength of the laser light. The apparatus includes a half-plate wave member, a first polarizing beam splitter member, a totally reflecting right angle prism, and a second polarizing beam splitter member, all of which are in serial optical alignment. Used in combination, the components convert a linearly (i.e., vertically) polarized laser light beam having a known coherence length, into two coincident, orthogonally polarized beams that are not coherent with each other. The resultant beams have an optical path difference exceeding the known coherence length of the laser, thereby eliminating the speckle in that system.

In U.S. Pat. No. 6,577,394 to Zavislan, there is disclosed a scanning laser confocal microscopy system for reducing speckle from scatterers that exist outside (above and below) the section which is being imaged by utilizing orthogonally polarized sheared beams. The sheared beams are focused to spots that are laterally or vertically offset. The polarized beams have opposite senses of circular polarization.

SUMMARY OF THE INVENTION

In accordance with the present invention there is provided a method and apparatus for speckle reduction in an imaging system using coherent light, particularly useful for determining the surface profile of a non-flat object/specimen by confocal imaging. To perform such imaging, the apparatus typically comprises a confocal aperture and means for focusing an incident beam at a plurality of axial locations. In such imaging, also known as confocal microscopy, speckle is particularly problematic because the confocal imaging process requires focusing laser light on the specimen surface when the most speckle occurs.

Thus, the apparatus of the present invention comprises a coherent light source for producing a light beam, imaging optics adapted to focus the light beam into at least one spot on a surface of a specimen, and a detector having an integration time, adapted to receive and detect light reflected from the surface; the imaging optics comprising at least one optical component located so that the light reflected from the specimen surface passes therethrough on its way to the detector, the optical component being movable so as to move the at least one spot to a number of distinct locations in a plane perpendicular to the optical axis within the detector's integration time.

The method of present invention for the confocal imaging a non-flat specimen comprises:

providing an apparatus comprising a source of coherent light and a detector;

focusing the coherent light into at least one spot on a surface of the specimen by means of imaging optics comprising a movable optical component; directing light reflected by the surface toward the detector via the movable optical component;

detecting the light by the detector; and moving the movable optical component so as to move the at least one spot to a number of distinct locations within the integration time of the detector.

The movement of the optical component is such that a distance between two spot locations that are maximally remote from each other does not exceed the lateral resolution of the apparatus.

The lateral resolution of the apparatus is the minimum lateral distance between two adjacent points on the specimen for which the apparatus can distinguish a difference in height.

Due to the specific location of the movable optical component of the present invention which ensures that both the incident and reflected light passes therethrough, the detector does not feel the movement of the optical component, i.e. the detected image is static.

During the movement of the optical component as defined above, the spot is moved from one location to another. This results in obtaining a number of independent speckle configurations corresponding to the number of the distinct locations of the spot, which are averaged by the detector over its integration time.

The confocal imaging apparatus of the present invention preferably comprises a beam-splitter and the imaging optics include a collimating lens and an objective lens, where at least the objective lens is disposed between the beam-splitter and the specimen.

The movable optical component referred to above may be the objective lens itself or an additional element located between the beam splitter and the specimen. Such additional element may be a transparent wedge or a mirror. The movement of the optical component may be regular or irregular. One example of the regular movement of the optical component is one that causes the spot on the specimen surface to follow a circular path around the location of the center of the spot if the optical component were static. A circular movement of the objective lens may accomplish this circular path, i.e. the center of the lens moves in a circle about the optical axis.

The invention may be applied equally well to multi-spot confocal systems such as in a confocal scanning apparatus disclosed in the Applicant's publication WO 00/08415. There, the laser light beam is divided into a plurality of beams to obtain a plurality of spots on the specimen surface. In such apparatus, the movable optical element in accordance with the present invention, will move each of the spots in the manner described above.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
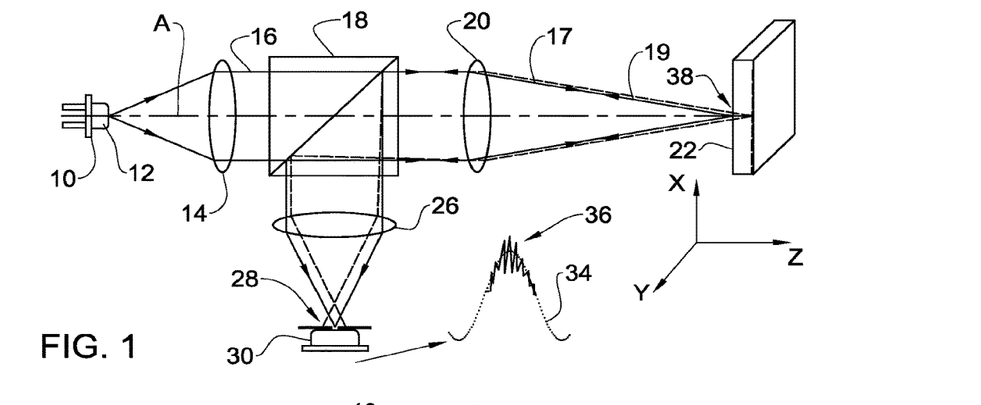
FIG. 1 is schematic view of a confocal scanning system as known in the art.

FIG. 1 shows a typical apparatus for determining a 3-D profile, or topography, of the surface of an object/specimen, e.g. a tooth, at a desired lateral and axial resolution. The apparatus is a confocal imaging system comprising a laser 10, which constitutes a source of coherent light 12; a collimating lens 14 disposed in front of the laser for collimating the emitted light into a beam 16; a beam splitter 18 through which the collimated beam 16 passes; an optical imaging component in the form of an objective lens 20 for focusing the light beam into a beam 17 (hereinafter 'incident light beam'), on a non-flat specimen 22 whose topography is to be determined. The above components are disposed along an optical axis A. The specimen 22 is shown in a perspective view to emphasize that it contains a depth (in Z-direction coinciding with the optical axis A) as well as a length and a width (in an X-Y plane perpendicular to the optical axis A). The incident light beam 17 that illuminates specimen 22 and forms thereon a spot 38, is reflected back through lens 20, producing a reflected beam 19 which passes through the lens 20 towards the beam splitter 18. The apparatus further comprises an image detector 30 having an integration time, and a focusing lens 26 and a confocal aperture or pinhole 28 disposed between this detector and the beam splitter, so that the beam 19 is reflected by the beam splitter 18 towards the detector 30 passes through the focusing lens 26 and the pin-hole 28.

When the specimen 22 is scanned axially (Z-axis), either by axial displacement of the specimen or by axial displacement of the objective lens 20, it will take positions at which the incident light beam 17 will or will not be focused on its surface. In the latter case, the reflected light 19 will be partially blocked by the pinhole 28 thus producing a low intensity signal at the detector 30. As the specimen 22 gets closer to an in-focus position, the amount of light passing through the pinhole 28 increases, yielding a maximum signal from the detector 30 at the best focus.

The intensity of the signal is thus related to the depth (i.e. along the Z-axis) of a scanned point. By imaging at a number of depths (Z-coordinates) an intensity profile can be obtained, which is known as an Optical Section Profile (OSP) 34. The peak of the OSP 34 yields the relative depth, or position, of the surface point on the specimen being scanned. Repeating the depth scanning process for every X and Y location on the specimen surface yields a full 3-D profile, or topography, of the specimen.

The phenomenon of speckle in the reflected light results in a noisy OSP 34, seen a wavy lines 36 in FIG. 1, impairing the accuracy of the depth coordinate determination. The nearer to focus the scanning spot 38 is on the specimen 22, the stronger the speckle contrast becomes, hence the noise recorded by the detector 30 is more significant at the peak of the OSP 34 where it is most unwanted.

Figure 2:
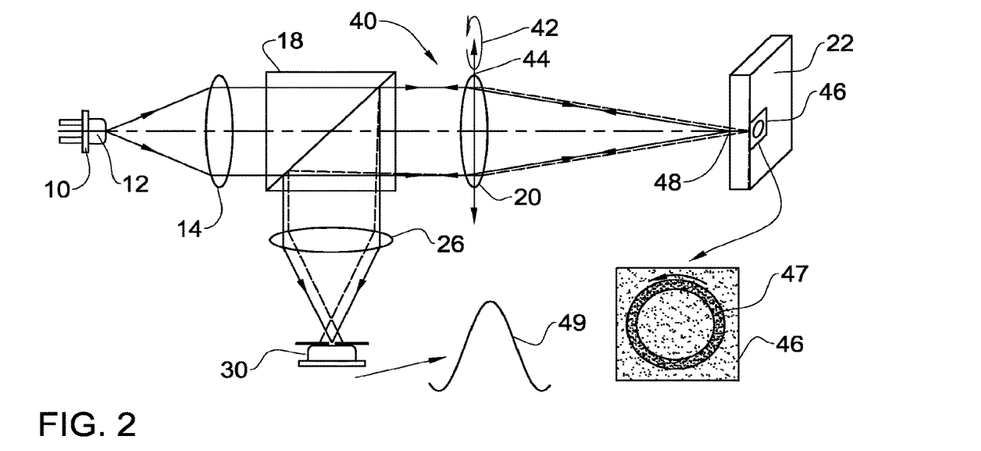
FIG. 2 is schematic view of a confocal scanning apparatus according to an embodiment of the present invention.

FIG. 2 illustrates a first embodiment of the present invention, where in an apparatus similar to that shown in FIG. 1, the objective lens 20 has an associated movement mechanism 40 for producing movement of the lens, as indicated by arrows 42 and 44. A possible movement mechanism 42 may be piezo-electric actuator.

The movement of the objective lens 20 is in a periodic manner so that the same path made by a spot 48 on the specimen is repeated at a certain rate. In this path, the spot 48 is moved so as to visit distinct locations within an area 46 of the specimen 22. This path may have any shape, e.g. be circular, oval, square, rectangular, polygonal, non-regular, etc. Spot trace 47 in FIG. 2 is an example of the footprint of a circular path taken by the spot 48 produced by the movement of the objective lens 20. A circular movement of the objective lens 20 may accomplish this circular path, i.e. the center of the lens moves in a circle about the optical axis A.

The length of the path of the spot 48 is preferably as large as possible to provide a greater number of independent speckle configurations, corresponding to the number of locations, for maximum statistical sampling. However, the distance between the most remote spot locations during the spot's movement shall be smaller than the lateral resolution of the apparatus. The lens movement is synchronized to the integration time of the detector 30 such that the averaging of the independent speckle configurations may be performed over one full period of spot movement, or a portion of it.

The detector 30 averages out these independent speckle configurations, thereby yielding a relatively smooth OSP 49, as shown in FIG. 2. The averaged signals collected during the integration time may be recorded automatically by known means and will not be discussed further.

The activities described above should be repeated to produce a relatively smooth OSP 49 at each scanned point, to determine the specimen's roughness, or topography.

Figure 3:
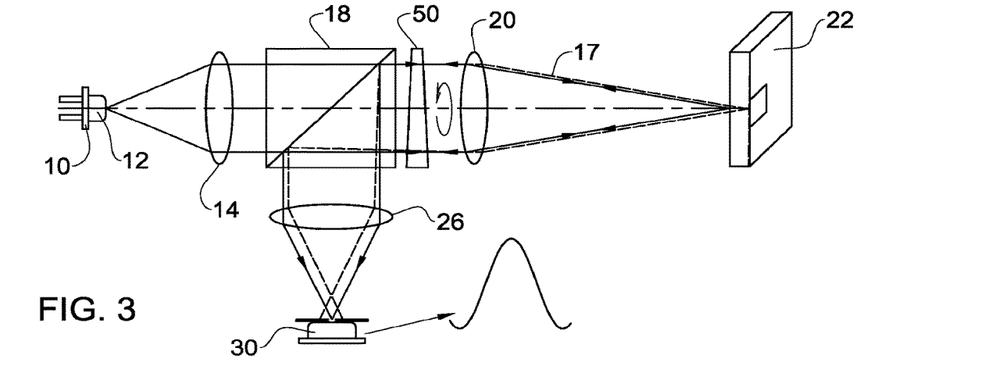
FIG. 3 is schematic view of a confocal scanning apparatus according to a different embodiment of the present invention.

FIG. 3 illustrates an apparatus in accordance with another embodiment of the present invention, which is similar to the apparatus described above with reference to FIG. 2, with the difference being in that it includes a movable optical element in the form of a transparent wedge 50, made for example of glass, disposed between the beam splitter 18 and the objective lens 20, with the latter being static. The wedge 50 is rotatable to stir the incident beam 17 in an angle, thereby giving rise to a corresponding movement of the spot 38 on the specimen 22 being scanned, as discussed in connection to FIG. 2.

It should be understood that the wedge 50 is merely an example of a refracting optical element whose rotation can produce a suitable angle diversification of the incident beam 17. Clearly, such element may have any other appropriate shape.

Figure 4:
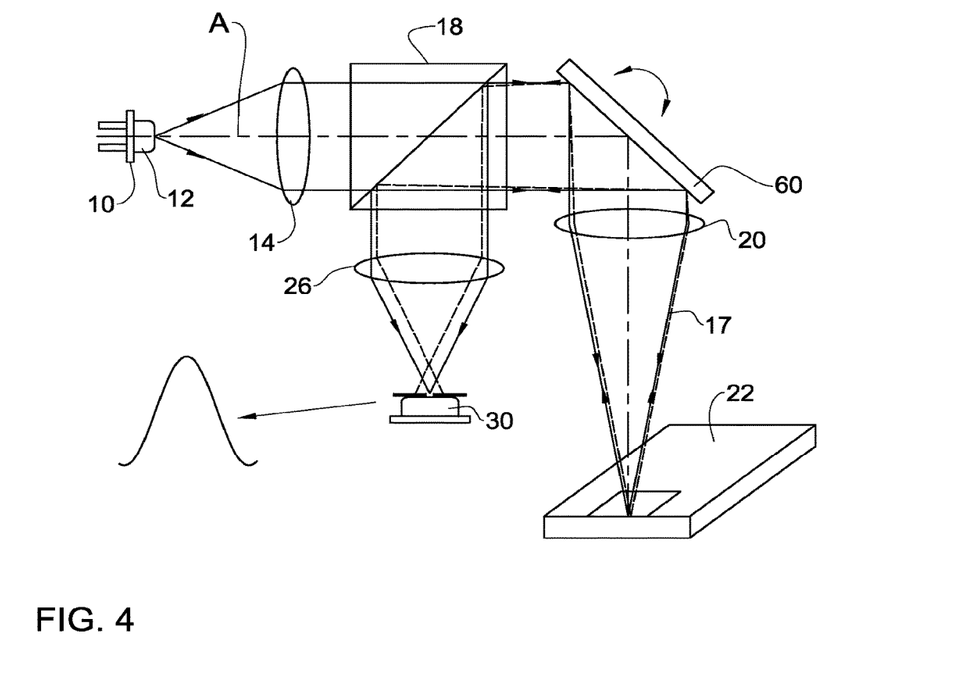
FIG. 4 is schematic view of a confocal scanning according to a further embodiment of the present invention.

FIG. 4 shows an apparatus according to a further embodiment of the present invention, which is similar to the apparatus described above with reference to FIG. 2, with the difference being in that it comprises a rotatable reflecting optical element in the form of a mirror 60 (preferably a dual axis mirror) located between the beam splitter 18 and the objective lens 20, with the latter being static.

The movement of the mirror 60 moves the collimated incident beam 17 in angle thereby giving rise to a corresponding movement of the laser spot on the specimen 22.

A fundamental virtue of the apparatus of the present invention is that, although there are moving optical components (e.g. the objective lens 20, the wedge 50 and the mirror 60) causing a spot to move accordingly on the specimen 22, there is no loss in the imaging (or confocal measurement) quality. The detector 30 does not observe the motion of the light spot on the specimen 22 since the reflected beam 19 passes back through the moving optical component (objective lens 20, wedge 50 and mirror 60). Thus, the spot on the detector remains a stationary diffraction limited spot.

Figure 5:
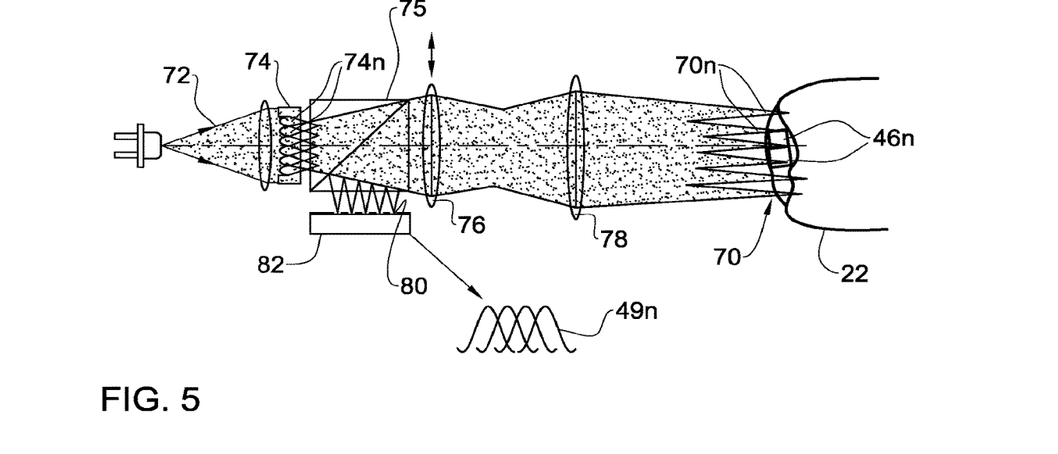
FIG. 5 is schematic view of a confocal scanning according to still further embodiment of the present invention.

FIG. 5 illustrates a further embodiment of the present invention wherein a multi-spot parallel confocal system is used, of the kind disclosed in Applicant's publication WO 00/08415. In this system, a grid or spot array 70 illuminates the specimen 22 (shown as a tooth in FIG. 5) and each spot 70$n$ of the array axially scans the specimen to produce a relatively smooth OSP 49$n$ of the corresponding X-Y area 46$n$ on the specimen 22. In other words, each illuminating spot 70$n$ in the array 70 undergoes a depth scan.

As seen in FIG. 5 a single laser beam 72 is collimated and passes into a micro-lens array 74 comprising a plurality of micro-lenses 74$n$. The array 74 generates spots at the focal points of the micro-lenses 74, one spot per micro-lens, correspondingly producing the desired spot array 70. The spot array 70 is directed onto the specimen 22, via a beam splitter 75 using magnifying optics including a source objective lens 76 and a specimen objective lens 78. The reflected light is directed, via the same lenses 76 and 78 and the beam splitter 75, toward a detector 82 having an array of n detector elements and having n pinholes 80 corresponding to the micro-lenses 74$n$ of the micro-lens array 74.

A relatively smooth OSP 49$n$ is generated from each detector element of the detector array 82, and thus the Z-coordinate is determined, at each corresponding X-Y area 46$n$. Again, the confocal scanning is obtained by moving the specimen objective lens 78 along the Z-axis over the desired depth of scan.

Any of the speckle reduction embodiments described hereinabove with reference to FIGS. 2 to 4, may be applied to the multi-spot confocal apparatus.

It can be appreciated that the above-described speckle reduction apparatus and method can be realized in a variety of embodiments and that those described hereinabove are merely examples. For example, other optical components may be suitable for moving an incident beam on a specimen in order to reduce speckle. Further, the above mentioned components may be used in combination with each other—or with other optical components.

What is claimed is:

1. An apparatus for confocal imaging of a non-flat specimen, the apparatus having an optical axis and being couplable to a light source for producing a light beam comprising coherent light, the apparatus comprising:
   an imaging optics system adapted to focus the light beam into at least one spot on the non-flat specimen; and
   a detector having an integration time and adapted to receive and detect light reflected from the non-flat specimen so as to generate a signal,
   the imaging optics system comprising an optical component, the optical component being movable so as to effect a periodic movement of the at least one spot to a plurality of distinct locations on the non-flat specimen along a predetermined path, the periodic movement of the at least one spot along the predetermined path synchronized to the integration time of the detector, wherein the detector is adapted to average light reflected from the plurality of distinct locations so as to reduce noise in the signal, and wherein the optical component is arranged along the optical axis between the light source and the non-flat specimen such that the light beam from the light source passes through the optical component to reach the non-flat specimen and the light reflected from the non-flat specimen passes through the optical component to reach the detector.

2. The apparatus according to claim 1, wherein the optical component comprises an objective lens.

3. The apparatus according to claim 2, wherein the objective lens is adapted to move circularly about the optical axis.

4. The apparatus according to claim 1, wherein the optical component comprises a reflecting optical element.

5. The apparatus according to claim 4, wherein the reflecting optical element is designed to move on dual axes.

6. The apparatus according to claim 1, wherein the optical component comprises a non-imaging optical element.

7. The apparatus according to claim 6, wherein the optical component comprises a wedge-shaped transparent component.

8. The apparatus according to claim 7, wherein the transparent component comprises glass.

9. The apparatus according to claim 7, wherein the transparent component is rotatable about the optical axis of the apparatus.

10. The apparatus according to claim 1, wherein the optical component is designed to produce a circular spot pattern on the non-flat specimen.

11. The apparatus according to claim 1, wherein the light beam comprises an array of light beams.

12. The apparatus according to claim 1, wherein the apparatus further comprises a beam-splitter.

13. The apparatus according to claim 1, wherein the apparatus comprises the light source for producing the light beam comprising the coherent light.

14. The apparatus according to claim 1, wherein the imaging optics system is configured to focus the light beam on a surface of the non-flat specimen as the at least one spot is moved to the plurality of distinct locations on the non-flat specimen along the predetermined path in a plane perpendicular to the optical axis within the integration time of the detector.

15. An apparatus according to claim 1, wherein said apparatus is adapted for axially scanning a surface of the non-flat specimen and for obtaining a depth measurement of the surface in a direction substantially parallel to the optical axis.

16. A method for confocal imaging of a non-flat specimen, the method comprising:
   using an imaging optics system to focus coherent light from a light source into at least one spot on the non-flat specimen, the imaging optics system comprising a movable optical component and an optical axis, wherein the coherent light from the light source passes through the movable optical component to reach the non-flat specimen;
   directing light reflected from the non-flat specimen through the movable optical component and toward a detector;
   detecting the reflected light using the detector so as to generate a signal; and
   moving the movable optical component so as to effect a periodic movement of the at least one spot to a plurality of distinct locations on the non-flat specimen along a predetermined path, the periodic movement of the at least one spot along the predetermined path synchronized to an integration time of the detector, wherein the detector is adapted to average light reflected from the plurality of distinct locations so as to reduce noise in the signal.

17. A method according to claim 16, wherein the movable optical component moves on dual axes.

18. A method according to claim 16, wherein the movable optical component rotates about the optical axis of the imaging optics system.

19. A method according to claim 16, wherein the movable optical component produces a circular spot pattern on the non-flat specimen.

20. A method according to claim 16, further comprising axially scanning a surface of the non-flat specimen and obtaining a depth measurement of the surface in a direction substantially parallel to an optical axis of the coherent light incident on the surface of the non-flat specimen.

21. The method according to claim 16, wherein the light beam is focused on a surface of the non-flat specimen as the at least one spot is moved to the plurality of distinct locations on the non-flat specimen along the predetermined path in a plane perpendicular to the optical axis within the integration time of the detector.

* * * * *